United States Patent
Johri et al.

(10) Patent No.: US 9,056,613 B2
(45) Date of Patent: Jun. 16, 2015

(54) SYSTEM AND METHOD FOR UPSHIFT TORQUE MODIFICATION USING AN UPSTREAM CLUTCH IN A HYBRID VEHICLE

(71) Applicant: Ford Global Technologies, LLC, Dearborn, MI (US)

(72) Inventors: Rajit Johri, Ann Arbor, MI (US); Mark Steven Yamazaki, Canton, MI (US); Wei Liang, Farmington Hills, MI (US); Xiaoyong Wang, Novi, MI (US); Ryan Abraham McGee, Ann Arbor, MI (US); Ming Lang Kuang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/073,166

(22) Filed: Nov. 6, 2013

(65) Prior Publication Data

US 2015/0126329 A1 May 7, 2015

(51) Int. Cl.
*B60W 10/08* (2006.01)
*B60W 20/00* (2006.01)
*B60W 10/10* (2012.01)

(52) U.S. Cl.
CPC .............. *B60W 20/40* (2013.01); *B60W 10/08* (2013.01); *B60W 10/10* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 5,188,005 A | 2/1993 | Sankpal et al. | |
| 6,176,808 B1 | 1/2001 | Brown et al. | |
| 7,954,581 B2 * | 6/2011 | Tanishima | 180/65.275 |
| 8,192,324 B2 | 6/2012 | Kraska et al. | |
| 8,387,730 B2 | 3/2013 | Bouchon | |
| 8,529,399 B2 * | 9/2013 | Schenk et al. | 477/3 |
| 8,540,603 B2 * | 9/2013 | Kobayashi et al. | 477/5 |
| 8,597,158 B2 * | 12/2013 | Heap et al. | 477/5 |
| 8,795,131 B2 * | 8/2014 | Yamazaki et al. | 477/3 |
| 2013/0296128 A1 * | 11/2013 | Nefcy et al. | 477/5 |

FOREIGN PATENT DOCUMENTS

WO  WO 2007102762 A1 *  9/2007

* cited by examiner

*Primary Examiner* — Dirk Wright
(74) *Attorney, Agent, or Firm* — David B. Kelley; Brooks Kushman P.C.

(57) ABSTRACT

A hybrid vehicle has an engine, an electric machine connected to the engine by an upstream clutch, a transmission gearbox connected to the electric machine by a downstream clutch, and a controller. The controller is configured to, in response to a commanded upshift of the gearbox, modulate a pressure of the upstream clutch. A method for controlling a vehicle includes, in response to a commanded upshift of a gearbox, controlling an upstream clutch to a first nonzero speed differential corresponding to a first inertia connected to and upstream of the gearbox to reduce inertia torque during the upshift. A method for controlling a vehicle includes, in response to a commanded upshift of a gearbox when the vehicle is beyond an electrical limit and a fast path torque reduction limit, slipping an upstream clutch and reducing torque outputs of an engine and an electric machine.

18 Claims, 7 Drawing Sheets

SYSTEM AND METHOD FOR UPSHIFT TORQUE MODIFICATION USING AN UPSTREAM CLUTCH IN A HYBRID VEHICLE

TECHNICAL FIELD

Various embodiments relate to controlling a hybrid vehicle during an upshift event.

BACKGROUND

Hybrid electric vehicles (HEV's) utilize a combination of an internal combustion engine with an electric motor to provide the power and torque needed to propel the vehicle. This arrangement provides improved fuel economy over a vehicle that has only an internal combustion engine. Clutches may be used to control the power flow and during transient vehicle operations, such as pulling up the engine or the electric motor or shifting a transmission, to provide smooth operation for the driver.

During an upshift in a vehicle transmission, a change in inertia occurs in the driveline because the speed ratio across the transmission changes during the upshift. The change in inertia coupled with the changing speed ratio causes an inertia torque in the driveline, or a resultant torque. If the inertia torque is not offset or compensated for, a driveline disturbance or torque hole may occur, where torque delivered to wheels is discontinuous and may be perceived by a user. The shift may not be smooth, and it may be challenging to meet user expectations regarding vehicle drivability and performance.

SUMMARY

According to an embodiment, a hybrid vehicle is provided with an engine, an electric machine connected to the engine by an upstream clutch, a transmission gearbox connected to the electric machine by a downstream clutch, and a controller. The controller is configured to, in response to a commanded upshift of the gearbox, modulate a pressure of the upstream clutch.

According to another embodiment, a method is provided for controlling a vehicle having an engine selectively coupled to an electric machine by an upstream clutch with the electric machine selectively coupled to a transmission gearbox by a downstream clutch. In response to a commanded upshift of the gearbox, the upstream clutch is controlled to a first non-zero speed differential corresponding to a first inertia connected and upstream of the gearbox to reduce inertia torque during the upshift.

According to yet another embodiment, a method is provided for controlling a vehicle having an engine selectively coupled to an electric machine by an upstream clutch with the electric machine selectively coupled to a transmission gearbox by a downstream clutch. In response to a commanded upshift of the gearbox when the vehicle is beyond an electrical limit and a fast path torque reduction limit, the upstream clutch is slipped. A torque output of the engine is reduced and a torque output of the electric machine is reduced.

Various embodiments of the present disclosure have associated, non-limiting advantages. For example, the engine, electric machine, and disconnect clutch may be controlled during an upshift in a transmission gearbox to compensate for inertia torque caused by inertia changes in the powertrain during an inertia phase of the upshift. Slipping the disconnect clutch during an upshift reduces the rotational inertia contributed by the engine and crankshaft to the overall powertrain inertia. Slipping the disconnect clutch during an upshift also reduces the input torque to the transmission as the engine torque transmitted to the motor shaft through the disconnect clutch is limited by the torque capacity of the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
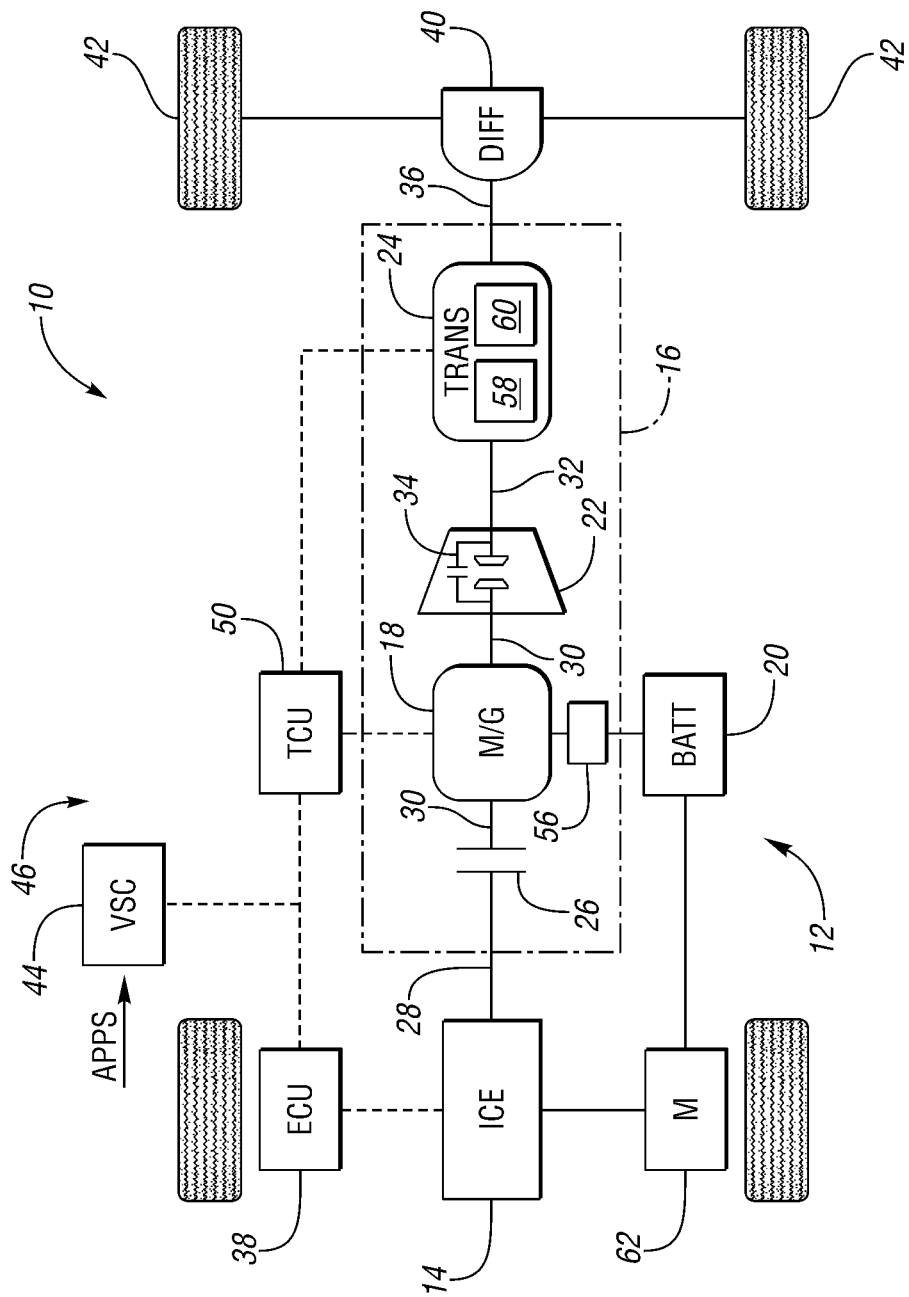
FIG. 1 is a schematic of a hybrid vehicle according to an embodiment.

FIG. 1 illustrates a schematic diagram of a hybrid vehicle (HEV) 10 according to an embodiment. FIG. 1 illustrates representative relationships among the components. Physical placement and orientation of the components within the vehicle may vary. The vehicle 10 includes a powertrain 12. The powertrain 12 includes an engine 14 that drives a transmission 16, which may be referred to as a modular hybrid transmission (MHT). In the embodiment illustrated, the various powertrain 12 components of the vehicle 10 are positioned sequentially in series with one another. As will be described in further detail below, the vehicle 10 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the vehicle 10. The engine 14 generally represents a prime mover that may include an internal combustion engine such as a gasoline, diesel, or natural gas powered engine, or a fuel cell. The engine 14 generates an engine torque and corresponding engine power that is supplied to the M/G 18 when a disconnect clutch 26 or upstream clutch between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18. The power electronics 56 may include a motor controller in communication with a control system 46.

In some embodiments, the vehicle 10 also includes a starter motor 62 operatively connected to the engine 14, for example, through a belt or gear drive. The starter motor 62 may be used to provide torque to start the engine 14 without the addition of torque from the M/G 18, such as for a cold start or some high speed starting events.

When the disconnect clutch 26 is at least partially engaged, torque flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transfers torque using its fluid coupling, and torque multiplication may occur depending on the amount of slip between the impeller and turbine sides. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22. The bypass or lock-up clutch for the torque converter may be selectively engaged to create a mechanical connection between the impeller side and the turbine side for direct torque transfer. The bypass clutch 34 may be slipped and/or opened to control the amount of torque transferred through the torque converter from the M/G 18 to the transmission 24.

The torque converter bypass clutch 34 may be operated as a launch clutch to provide smooth vehicle launch. Alternatively, or in combination, a launch clutch or downstream clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch. The torque converter 22 with the launch clutch 34 may be collectively known as a downstream torque transfer device.

Although the operation of the clutches 26, 34 described uses the term "pressure", thereby implying a hydraulic clutch, other types of devices, such as electromechanical clutches or torque converters where appropriate may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches 26, 34 described herein are in terms of "pressure", though it is understood that it also includes situations where a non-hydraulic force is applied to the clutch plates in a non-hydraulic clutch.

When one of the clutches 26, 34 is locked or engaged, the rotational speeds of the driveline components on either side of the clutch are equal. Slip is the speed difference from one side of a clutch to the other, such that when one of the clutches is slipping, one side has a different speed than the other side. For example, if the crankshaft 28 rotational speed is at 1500 rpm and the disconnect clutch 26 is slipping 100 rpm, the M/G shaft 30 side of the disconnect clutch 26 is at 1400 rpm.

To prepare the clutch for use, the clutch is filled and then stroked. The clutch is stroked by increasing the pressure to the stroke pressure to prepare the clutch for engagement by taking play out of the clutch by reducing the clearance between the clutch plates. The clutch may be controlled after stroke by increasing the pressure, thereby controlling the torque capacity, slip, and/or torque transferred by the clutch, and the clutch is then in an active control phase. The clutch may be locked by increasing the pressure to the clutch until there is no slip in the clutch and may include increasing the pressure to a maximum design pressure. Engaging the clutch may refer to controlling and/or locking the clutch.

As used in this disclosure, the torque capacity of a clutch, such as clutch 26, 34, refers to an operating torque capacity corresponding to the maximum amount of torque that can be transmitted through the clutch for a particular clutch pressure. In general, increasing the clutch pressure will increase the clutch capacity and allow more torque to be transmitted through the clutch. Clutch capacity can be determined for a particular (constant) clutch pressure by increasing torque on one side of the clutch up to the point where the clutch starts to slip. After slipping starts, the torque capacity of the clutch stays generally constant if the pressure stays constant, as the dependence on slip speed is typically small. As such, at a given torque capacity, if the torque increases on the input side of the clutch, the speed will increase on that side of the clutch (and the slip will increase) while the torque transmitted through the clutch remains substantially constant because the clutch is at a given torque capacity. Alternatively, if the clutch is slipping and at a constant pressure, lowering the torque on the input side of the clutch (thus slowing the rotational speed on that side) will slow or stop the slip. Similarly, for a given torque through the clutch, the clutch will begin to slip or increase slip if clutch pressure is sufficiently lowered. A clutch is locked when there is no slip in the clutch. When a clutch is locked at full pressure it is typically designed such that it does not slip with an increase in torque up to the design limit or failure. The torque capacity of a locked clutch at full pressure is the maximum designed torque capacity.

While the clutch is slipping the input and output sides of the clutch are effectively isolated. As such, the speed (and torque of torque producers) on one side of the clutch may vary and be disturbed while the torque transferred to the other side of the clutch is limited or isolated based on the current torque capacity of the clutch.

All of the input torque to the transmission gearbox 24 flows through the torque converter 22. The gearbox 24 may include gear sets (not shown) that are selectively placed in different gear ratios by selective engagement of friction elements such as clutches and brakes to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a transmission control unit (TCU) 50. The gearbox 24 then provides powertrain output torque to output shaft 36.

The transmission 24 may be an automatic, step ratio transmission gearbox and connected to the drive wheels 42 in a conventional manner, and may include a differential 40. The vehicle 10 is also provided with a pair of non-driven wheels, however, in alternative embodiments, a transfer case and a second differential can be utilized in order to positively drive all of the vehicle wheels. The automatic, step ratio transmission 24 has a gear box to provide various gearing ratios for the vehicle 10. The transmission 24 gearbox may include clutches and planetary gearsets, or other arrangements of clutches and gear trains as are known in the art. The transmission 24 may be an automatic six speed transmission, or other speed automatic transmission as is known in the art. The transmission 24 may also be another step-ratio transmission as is known in the art.

The transmission 24 is controlled using the TCU 50, or the like, to operate on a shift schedule, such as a production shift schedule, that connects and disconnects elements, such as shifting clutches within the gear box to control the ratio between the transmission output and transmission input. The transmission 24 is illustrated as having two shifting clutches 58, 60 although any number of shifting clutches is anticipated. For example, shifting clutch 58 is associated with a low gear and shifting clutch 60 is associated with a higher gear in the transmission 24. For an upshift, clutch 58 is disengaged and clutch 60 is engaged. For a downshift, clutch 60 is disengaged and clutch 58 is engaged. The use and control of shifting clutches in an automatic transmission is known in the art. The TCU 50 may also act to control the M/G 18, and the clutches 26, 34. The shifting clutches 58, 60 may be hydraulically or electrically controlled.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. For example, an AMT may be used in applications with higher torque requirements.

In the vehicle 10, the bypass clutch 34 may be locked to increase fuel efficiency, for example, at higher vehicle speeds. M/G 18 torque and speed may be controlled to a greater accuracy and with a faster response time than engine 14 torque and speed. During an electric-only mode of operation for the vehicle 10, the M/G 18 torque and speed may be controlled during a transmission 24 shift event. During a hybrid mode of operation of the vehicle with both the engine 14 and M/G 18 operating, the M/G 18 torque and speed and engine 14 torque and speed may be controlled together during a transmission 24 shift event.

The M/G 18 is in communication with a battery 20. The battery 20 may be a high voltage battery. The M/G 18 may be configured to charge the battery 20 in a regeneration mode, for example when vehicle power output exceeds driver demand, through regenerative braking, or the like. The M/G 18 may also be placed in a generator configuration with negative torque output to moderate the amount of engine 14 torque provided to the driveline 16 or to control the speed at the input side of the transmission 24. When the M/G 18 output speed is decreased, an associated negative M/G 18 torque output provides battery 20 charge. In one example the battery 20 is configured to connect to an external electric grid, such as for a plug-in electric hybrid vehicle (PHEV) with the capability to recharge the battery from an electric power grid, which supplies energy to an electrical outlet at a charging station. A low voltage battery (not shown) may also be present to provide power to the starter motor or other vehicle components, or low voltage power may be provided through a DC to DC converter.

An engine control unit (ECU) 38 is configured to control the operation of the engine 14. A vehicle system controller (VSC) 44 transfers data between the TCU 50 and ECU 38 and is also in communication with various vehicle sensors. The control system 46 for the vehicle 10 may include any number of controllers, and may be integrated into a single controller, or have various modules. Some or all of the controllers may be connected by a controller area network (CAN) or other system. The control system 46 may be configured to control operation of the various components of the transmission 24, the motor generator assembly 18, and the engine 14 under any of a number of different conditions, including in a way that provides a consistent quality upshift.

The VSC 44 determines when and how much torque each power source needs to provide in order to meet the driver's torque demand and to achieve the operating points (torque and speed) of the engine 14 and M/G 18. The VSC 44 may interpret a total vehicle torque which includes any positive or negative engine 14 or M/G 18 torque as well as road load torque.

The control system 46 controls various actuators in response to signals from various sensors to control functions such as starting/stopping engine 14, operating M/G 18 to provide wheel torque or charge battery 20, selecting or scheduling transmission shifts, etc. Control system 46 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, control system 46 may communicate signals to and/or from engine 14, disconnect clutch 26, M/G 18, launch clutch 34, transmission gearbox 24, and power electronics controller 56. Although not explicitly illustrated, those of ordinary skill in the art will recognize various functions or components that may be controlled by control system 46 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Under normal powertrain conditions (no subsystems/components faulted), the VSC 44 interprets the driver's demands, and then determines the wheel torque command based on the driver demand and powertrain limits. An accelerator pedal is used by the driver of the vehicle to provide a demanded torque, power, or drive command to propel the vehicle. The VSC 44 receives signals from an accelerator pedal position sensor (APPS) and a brake pedal to determine vehicle acceleration or deceleration demands.

To drive the vehicle using the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy to power electronics 56 that may include an inverter, for example. The power electronics 56 convert DC voltage from the battery 20 into AC voltage to be used by the M/G 18. The power electronics 56 convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

The M/G 18 and the battery 20 have an electrical limit that provides a maximum positive and negative torque or power available electrically. The electrical limit may be based on a number of factors, including, but not limited to, M/G temperature, state of charge of the battery, battery temperature, maximum electric machine torque and speed, and the like. The electrical limit may vary as the vehicle operating conditions change, and may be determined by the control system 46. The control system 46 may monitor the battery temperature, voltage, current, state of charge (SOC) and determine the maximum allowable discharge power limit and the maximum allowable charge power limit at that time.

The TCU 50 and VSC 44 cooperate to provide control of the gear ratio of the transmission 24 and shifting. Transmission shift control is the process of changing the active torque transmitting gear from one to another. Typically it has two phases, a torque control phase and a speed control phase. The torque control phase switches the torque from the old shifting clutch to the new shifting clutch. The speed control, or inertia, phase aligns the transmission 24 input speed to the output speed across the new gear such that the new shifting clutch may be engaged and locked and the new gear ratio can be achieved. With a torque converter 22, the transmission 24 input speed is linked either hydraulically or mechanically to the speed of the M/G shaft 30, which is the output speed of both engine 14 and electrical machine 18 in vehicle 10. The speed of the M/G output shaft 30 is also known as the impeller speed. Therefore during the inertia phase, the engine 14 torque and electrical machine 18 torque may be controlled so the impeller speed quickly approaches the target synchronization speed in order to lock the new shifting clutch. In a gear shift, the impeller speed and impeller torque may be different than that need to complete the shift, and as the speed of the shaft 30 is changed to a synchronized speed, a change in the speed ratio across the transmission occurs. Also, the changing speed of the powertrain 12 causes a change in inertia of the powertrain 12 upstream of the transmission 24. The changes in inertia and speed ratio cause a corresponding inertia torque disturbance in the powertrain 12 during the inertia phase.

For an upshift in the transmission 24 to be completed, shifting clutch 58 associated with the old gear ratio is slipped and then disconnected, and shifting clutch 60 associated with the new, desired higher gear ratio is slipped and then engaged. For the shifting clutch 60 to be engaged, the input speed to the transmission 24 needs to be at or about a synchronization speed, or target speed. When the input speed of the transmission 24 is at the synchronization speed, the speed at the input and output sides of the second shifting clutch 60 are approximately the same, thereby allowing the clutch to lock. When the speeds across the shifting clutch are not generally the same, it may be difficult to engage the shifting clutch and complete the shift. During the inertia phase of an upshift, the transmission 24 upstream speed needs to be reduced to reach the synchronous speed and therefore changes from a higher speed to a lower speed. This change in speed creates additional torque in the powertrain 12 known as inertia torque. To provide consistent torque downstream of transmission, the inertia torque caused by the change in speed during the shift may need to be compensated or offset by reducing the torque upstream of the transmission 24.

The synchronization speed is determined using the output speed of the transmission 24, and the new, desired gear ratio. The speed ratio is the inverse of the gear ratio. The input speed of the transmission 24 times the speed ratio provides the output speed of the transmission 24. When the input speed of the transmission 24 is approximately the synchronization speed, the input speed times the speed ratio at the new, desired gear ratio is approximately the output speed of the transmission 24, and slip across the shifting clutch in the transmission 24 is at or near zero. The synchronization speed for various gear ratios or speed ratios in the transmission 24 may be provided in a calibration or lookup table in the VSC 44 or TCU 50.

During operation in a drive mode (D), the TCU 50 anticipates a shift point based on a shift schedule, and controls the engine 14, or the engine 14 and M/G 18, as described below such that the input speed of the transmission 24 reaches the synchronization speed to provide a well-controlled, smooth shift. Changes in inertia in the powertrain cause an inertia torque disturbance in the driveline that may be apparent to the user during an upshift.

During an upshift, the input torque to the transmission needs to be reduced to compensate for the change in inertia and associated inertia torque as the engine speed and/or M/G changes from higher speed to lower speed for the gear change. In an engine 14, engine torque may be modified via a fast path and a slow path. The fast torque path for a gasoline or spark ignition engine is spark retard. The slow torque path is via control over engine intake air flow. During an upshift, torque modification may be implemented via fast path, which provides an instantaneous reduction in torque. However, spark retard may result in increased emissions and/or engine misfire. The engine misfire limit puts an upper constraint in reducing engine torque via fast path. Emissions regulations or controls may reduce the upper constraint further. Additional torque reduction at the engine requires modifying the air or slow path.

In the vehicle 10, the inertia torque may be significantly larger compared to a conventional driveline due to the addition of the M/G 18 and disconnect clutch 26 upstream of the transmission 24. For example, when the engine 14 is producing a large torque and an upshift is commanded, it may not be possible to completely compensate for inertia torque with a reduction in M/G 18 torque and engine 14 fast torque. Modification of engine 14 slow torque may have too slow of a response time for use offsetting the inertia torque during the upshift as it may result in a slower response time for the shift and a longer shift time. This may be especially apparent for upshifts in the vehicle 10 at higher crankshaft speeds, as the associated charge in inertia is larger.

Figure 2:
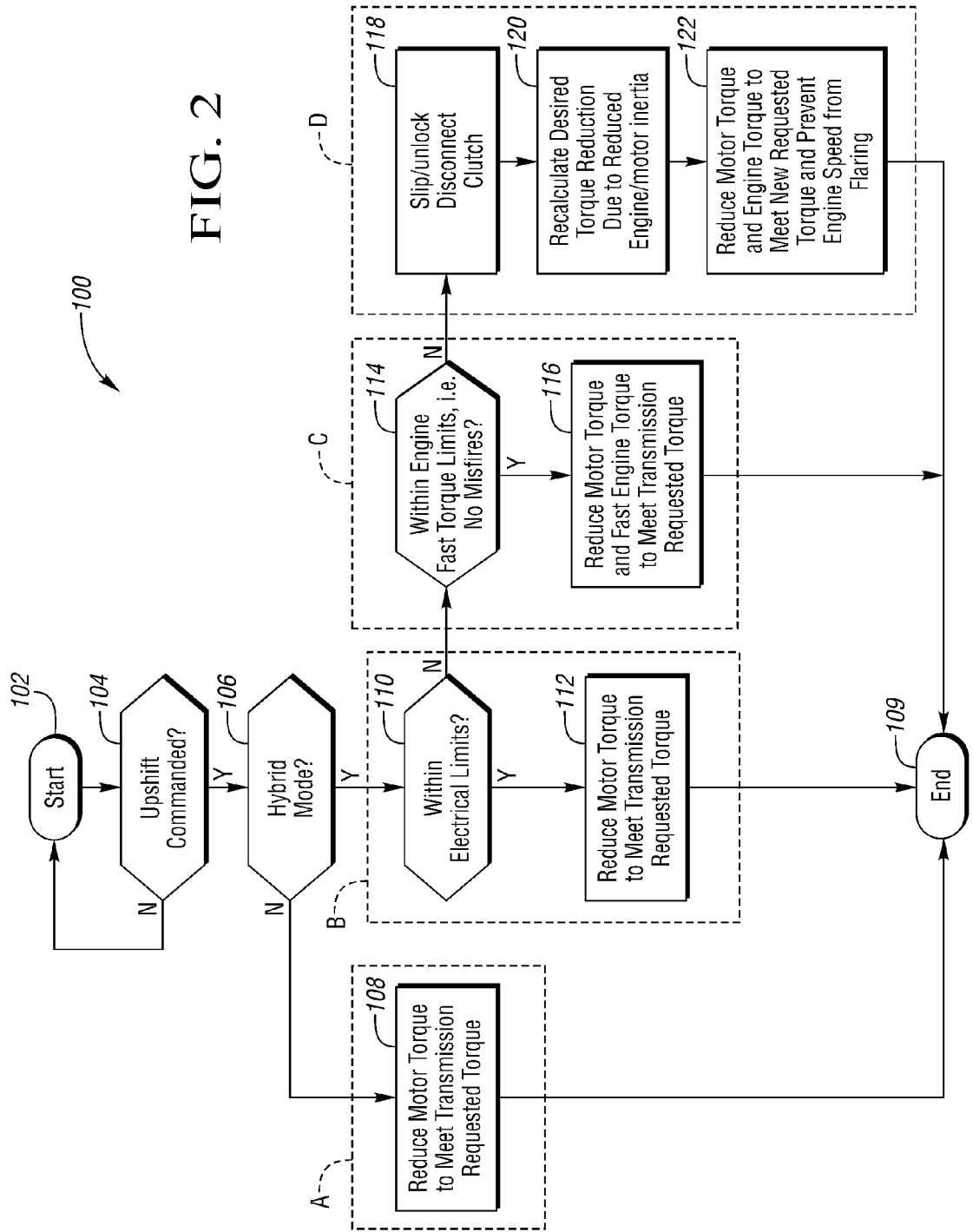
FIG. 2 is a flow chart illustrating a method of controlling a hybrid vehicle according to an embodiment.

FIG. 2 illustrates a method 100 of controlling the vehicle 10 according to an embodiment. Various steps in the flow chart may be rearranged or omitted, and other steps may be added within the spirit and scope of the disclosure. The method 100 may also be applied to other hybrid vehicle architectures as are known in the art. The method 100 provides for upshift torque modification by slipping/unlocking the disconnect clutch 26 along with the M/G 18 torque reduction and engine 14 fast path torque reduction. The method 100 allows for torque compensation for inertia torque during an upshift in the transmission 24 without slow torque modification, thereby improving the vehicle 10 drivability and performance. The disconnect clutch 26 may be slipped or unlocked to reduce the torque inertia caused by the rotation of the engine 14 and crankshaft 28, and hence, the overall torque reduction during the inertia phase to compensate for the inertia torque. An additional torque reduction is provided by slipping or unlocking the disconnect clutch 26 to partially isolate the engine 14 torque from the transmission input 32, as the reduced clutch capacity of the slipping clutch 26 permits a reduced amount of engine torque to be transferred from the crankshaft 28 to the motor shaft 30. Slipping or unlocking the disconnect clutch 26 has a faster response time than engine slow torque modification and therefore, upshift performance may be improved with a faster compensation for inertia torque during the upshift.

In the MHT powertrain 12, inertia upstream of the transmission 24 requires different control strategies based on the operating mode of the vehicle 10 to compensate for the inertia torque during an upshift compared to a conventional vehicle or a different hybrid vehicle architecture.

The control system 46 uses method 100 and begins at block 102. If an upshift has been commanded from the transmission 24, for example, by the TCU 50, the control system 46 proceeds from 104 to block 106.

At 106, the control system 46 determines if the vehicle 10 is operating in a hybrid mode of operation or an electric-only mode of operation. For the hybrid mode of operation, the engine 14 and the M/G 18 are operating. The engine 14 is providing torque output to the vehicle 10, and the M/G 18 is acting as a motor to provide torque to the vehicle 10, or as a generator to charge the battery 20. If the vehicle 10 is operating in an electric-only mode, the vehicle 10 proceeds to block 108, and subroutine A. If the vehicle 10 is operating in a hybrid mode, the control system 46 proceeds to block 110.

At block 108, the vehicle is operating in an electric-only mode, with the engine 14 disabled and the disconnect clutch 26 open. The control system 46 commands the M/G 18 torque to meet the requested input torque to the transmission 24 at shaft 32 for the inertia phase of the upshift. The M/G 18 is the sole torque producer operating in the vehicle 10 at this time, and the fast response time of the electric machine provides for the ability to offset or compensate the inertia torque caused during the upshift. In electric-only mode, the disconnect clutch 26 is open such that the engine 14 is not contributing to inertia or providing torque to the transmission 24. The M/G 18 inertia is compensated for by reducing the M/G 18 torque. The control system 46 then proceeds to end the method at block 109.

At block 110, the control system 46 enters subroutine B. The vehicle is operating in a hybrid mode. The disconnect clutch 26 is at least partially engaged and transmitting torque from the engine to the motor shaft 30. The inertia upstream of the transmission 24 includes contributions from the rotating engine 14, M/G 18, and disconnect clutch 26. This inertia may be larger than a conventional driveline due to the additional motor 18 and clutch 26 which results in larger inertia torques to be compensated for during upshifts.

At block 110, the control system 46 determines if the torque inertia can be compensated for within the electrical limit of the vehicle 10. If the electrical limit is such that the M/G 18 can compensate for the inertia torque caused by the upshift while remaining within the electrical limits, the control system proceeds to 112. In other words, the control system 46 determines if the commanded or requested torque including the reduction due to inertia torque is within electrical limits of the M/G 18, battery 20, and vehicle 10.

If the electrical limit is such that the M/G 18 has an insufficient available torque output to offset or compensate for the inertia torque, the control system 46 proceeds to the next subroutine, shown here as subroutine C. In other words, the control system 46 determines if the commanded or requested torque including the reduction due to inertia torque is outside electrical limits of the M/G 18, battery 20, and vehicle 10.

At block 112, the control system 46 commands the M/G 18 torque to a reduced torque output to meet the requested input torque to the transmission 24 at shaft 32 for the inertia phase of the upshift. The control system 46 also commands the engine 14 to produce a generally constant engine torque. By not using engine fast torque reduction at this point, emissions or fuel economy for the vehicle 10 are not affected. The control system 46 then proceeds to end the method at block 109.

In subroutine C, the control system 46 determines the torque inertia can be compensated for by a combination of M/G 18 torque and a fast path engine torque reduction at 114. Fast path engine torque reduction is accomplished by spark retard in a spark ignition engine, and by reducing fuel injection or fuel flow in a compression ignition engine. If the requested torque at the transmission 24 input can be met by reducing the M/G 18 torque and engine 14 torque via fast path without engine misfires, the control system 46 commands a M/G 18 torque reduction and a fast torque reduction to the engine 14 at 116. The control system 46 then proceeds to end the method at block 109.

If the requested torque at the transmission 24 input cannot be met by reducing the M/G 18 torque and engine 14 torque via fast path without engine misfires, the control system 46 proceeds to subroutine D. At block 118, the control system 46 commands a controlled slip of the disconnect clutch 26. In one example, the control system 46 slips the clutch 26 to a specified torque capacity or a specified speed differential across the clutch 26 by reducing or modulating the pressure to the clutch 26. Slipping the clutch 26 has a fast response time and may be used to assist in offsetting the inertia torque during an upshift. Torque capacity may be a function of temperature and pressure, and the control system 46 may control the torque capacity using a feed forward control algorithm, a feedback loop, or other techniques as is known in the art.

At 120, the control system 46 calculates the new inertia torque to be compensated for based on the new clutch 26 torque capacity and slip. Slipping the disconnect clutch 26 has two effects during the upshift. First, by slipping the clutch 26, the upstream inertia of the powertrain 12 is reduced as the engine 14 is connected to the shaft 30 only to the extent allowed by the slipping clutch 26. Therefore, only a fraction of engine 14 inertia needs to be compensated for during the upshift, and the amount of torque reduction required to compensate for the inertia torque is effectively reduced. Second, by slipping the clutch 26, the amount of torque transmitted from the engine 14 via the disconnect clutch 26 to the shaft 30 and the input of the transmission 24 is reduced to a torque value that is no more than the torque capacity of the clutch thereby creating virtual torque reduction as only a portion of the engine 14 torque output is being transferred to the motor shaft 30 and transmission 24. Any engine 14 torque above the clutch 26 capacity increases the slip of the clutch 26 and is not transmitted to the shaft 30.

At 122, the control system 46 reduces the M/G 18 torque output, and reduces the engine 14 torque output via a fast path torque reduction. The control system 46 controls the amount of slip in the disconnect clutch 26. The control system reduces the M/G 18 torque up to the electrical limit to compensate for the inertia torque. The control system 46 also commands an engine fast torque reduction to maintain engine speed, reduce torque, and to prevent an engine speed flare up based on a reduced crankshaft 28 load caused by the disconnect clutch 26 slipping. In some examples, the control system 46 may need to fully open the clutch 26 such that no torque is transferred from the engine 14 to the shaft 30; however, engine 14 speeds may become more challenging to control. In other examples, additional torque reduction may be necessary if the powertrain torque cannot be sufficiently reduced via a combination of M/G 18 torque control, fast path engine 14 torque reduction, and disconnect clutch 26 control; and the control system 46 may need to control the engine slow path torque.

The control system 46 then proceeds to end the method at block 109 when the upshift is completed. At the end of an upshift, the disconnect clutch 26 is locked and spark is restored.

In another example of the method 100, subroutine C is conducted prior to subroutines B and D, with engine fast torque reduction occurring first for inertia torque compensation when the vehicle is operating in a hybrid mode. The control system 46 commands the engine 14 to a reduced torque via fast path torque control. If the torque reduction demand cannot be met without misfire, the control system 46 commands the M/G 18 to a reduced torque output. If the combined reduction in the torque due to the engine fast torque reduction and the motor is insufficient, the control system 46 then slips the disconnect clutch 26. This may be beneficial in a compression ignition engine, such as a diesel engine, as fast path torque control is conducted for a vehicle 10 having using fuel control to reduce fuel flow to the engine, which in turn reduces fuel consumption and increases fuel economies.

In yet another example of the method 100, a variation of subroutine D is conducted before subroutine C, with the clutch 26 slipping to compensate for inertia torque prior to reducing engine 14 torque via fast path torque reduction. The clutch 26 may be slipped in conjunction with reducing M/G 18 torque output to compensate for inertia torque during the upshift without having to reduce the engine 14 torque via fast path torque control. This may decrease emissions as there is no spark retard. If there is insufficient torque reduction by clutch 26 slipping and reducing the M/G 18 torque, the control system 46 may then begin to reduce the engine 14 torque via fast path torque reduction.

Figure 3:
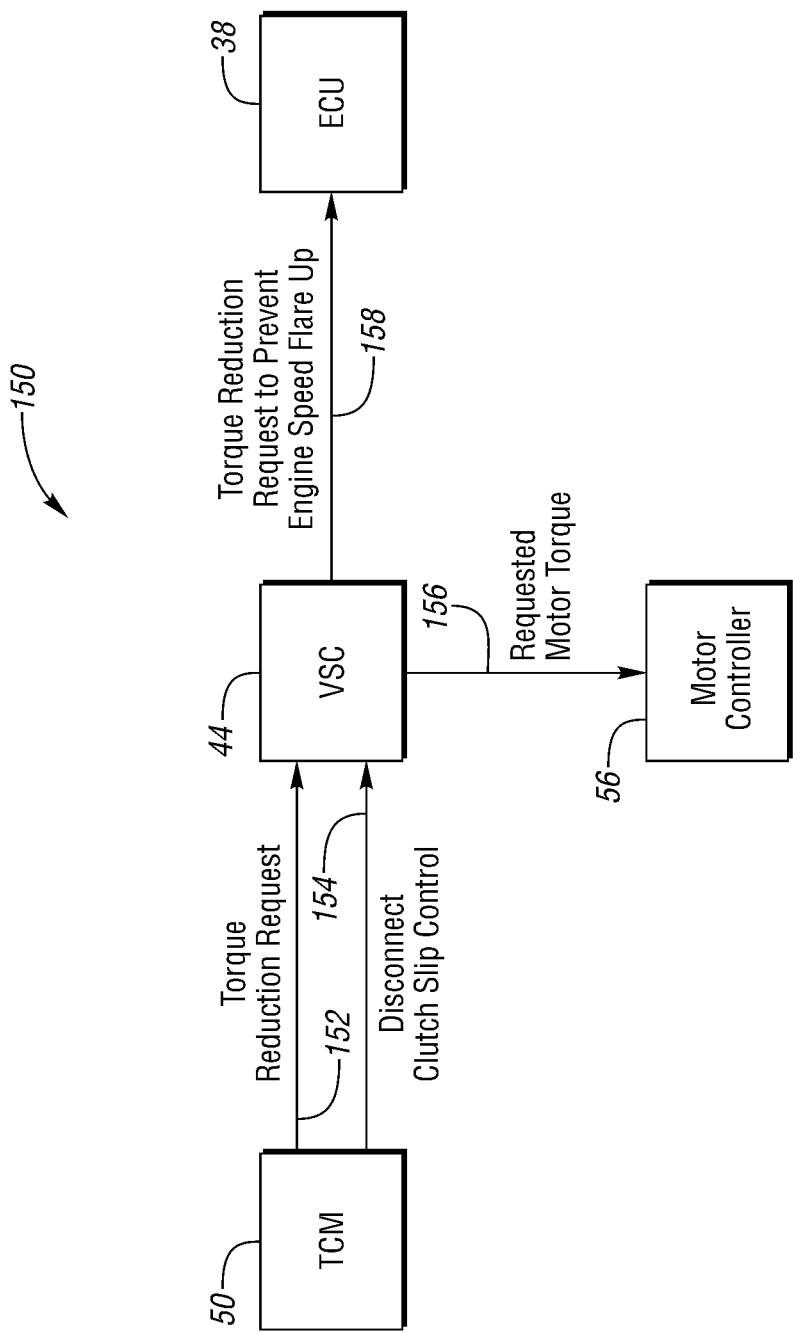
FIG. 3 is a block control diagram for the vehicle of FIG. 1 and the method of FIG. 2.

FIG. 3 illustrates a block diagram 150 representing an example of signal communications between various controllers in a control system. The TCU 50 sends a torque reduction request 152 in preparation for an upshift. In the example shown, the control system 46 is implementing subroutine D, and the VSC 44 sends a signal to the TCU 50 commanding the disconnect clutch 26 to slip at 154. The VSC 44 sends a signal to the motor controller 56 with a requested M/G 18 torque output at 156 to meet at least a portion of the torque reduction request 152. The VSC 44 also sends a signal to the ECU 38 at 158 with a requested engine torque output to meet at least another portion of the torque reduction request 152 and/or to prevent engine speed flaring with the clutch 26 slipping.

FIGS. 4-7 illustrate various examples of timing charts for the implementation of method 100 in vehicle 10, and similar features between the figures have common reference numbers.

Figure 4:
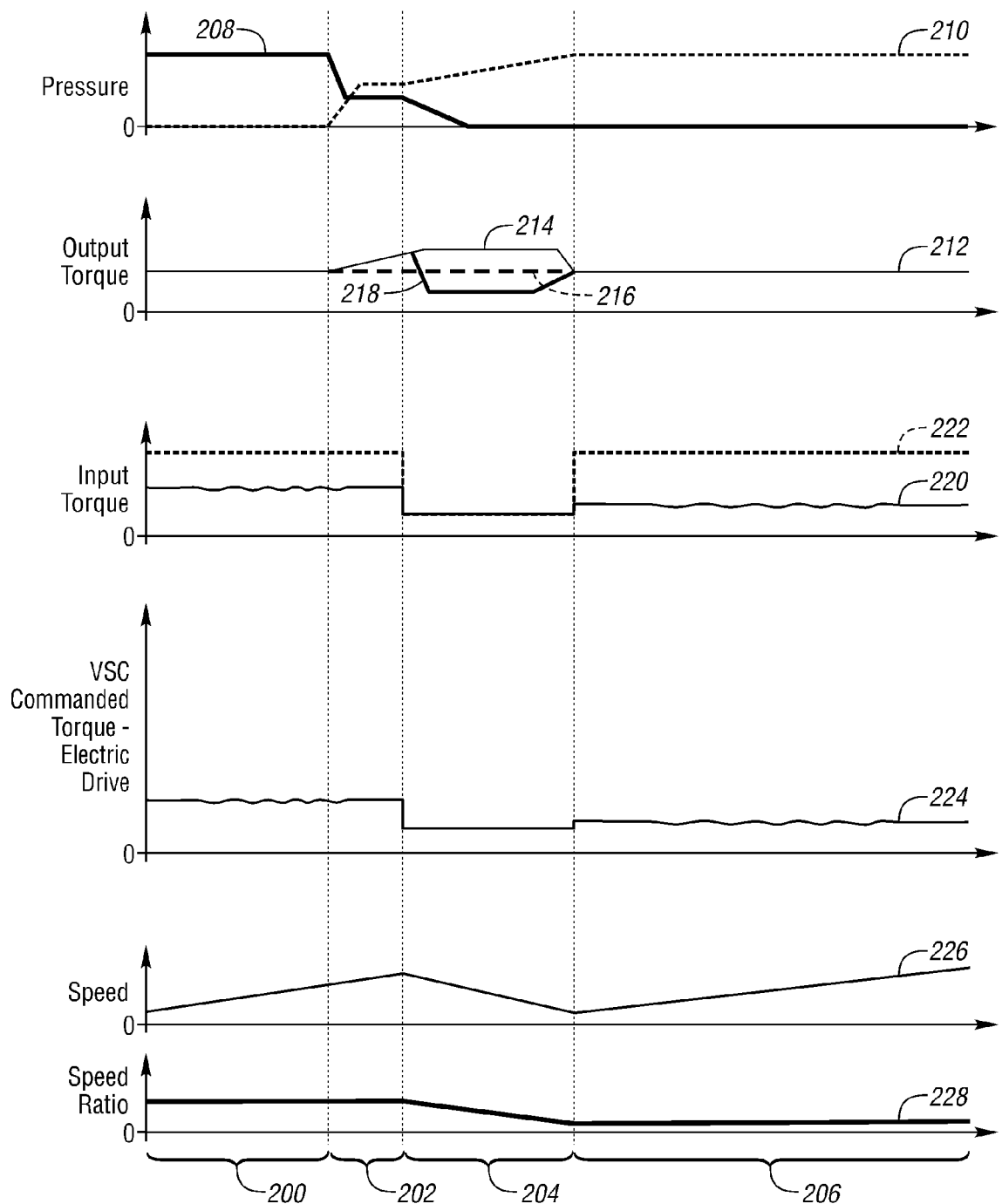
FIG. 4 is a timing chart for the hybrid vehicle during a user requested upshift in an electric mode of vehicle operation according to an embodiment.

FIG. 4 illustrates a signal diagram representative of an example of subroutine A in method 100. The vehicle 10 is operating in an electric-only mode of operation, where the engine 14 is not operating and the disconnect clutch 26 is open. The upstream inertia in the powertrain 12 is reduced because the engine 14 and disconnect clutch 26 are not contributing to the inertia at this time, and the M/G 18 is able to provide the torque to offset the inertia torque during the upshift.

Time region 200 is before an upshift begins. The control system 46 commands a change of the shifting clutch in the transmission 24. The control system 46 disengages the shifting clutch 58 associated with the current gear ratio to begin slipping, as shown by the decrease in pressure for the shifting clutch 58 at 208. The control system 46 may also begin to pressurize the oncoming shifting clutch 60 in the transmission associated with the desired gear ratio to be able to control the slip as shown by line 210. Time region 202 is after an upshift has begun and corresponds to a torque control phase for the upshift. Region 204 is a speed control or inertia control phase for the upshift. The shift is completed at region 206.

The transmission 24 output torque is shown at line 212. Line 214 shows the output torque of the transmission 24 if no control such as method 100 is implemented in the vehicle 10 during the shift. Line 216 illustrates the desired or commanded torque output from the transmission 24. A generally constant value for line 216 may be desirable, as it would present little or no torque disturbance to a user. Line 218 illustrates a torque countermeasure using the engine 14, M/G 18, and disconnect clutch 26.

Line 220 illustrates the desired or commanded input torque to the transmission 24, for example, at motor output shaft 30 to offset the inertia torque at 214. Line 222 represents a fast torque limit for the TCU 50.

Line 224 shows the commanded or requested M/G 18 output torque to provide the torque line shown at 220. As can be seen from the graph, the motor output torque 224 is reduced during the inertia phase of the shift to provide the transmission input torque at 220 to offset the inertia torque 214.

Line 226 illustrates the transmission 24 input speed. Line 228 illustrates the speed ratio across the transmission 24. A changing speed ratio may be seen in region 204 of line 228 showing the inertia phase and inertia change for the powertrain 12.

Figure 5:
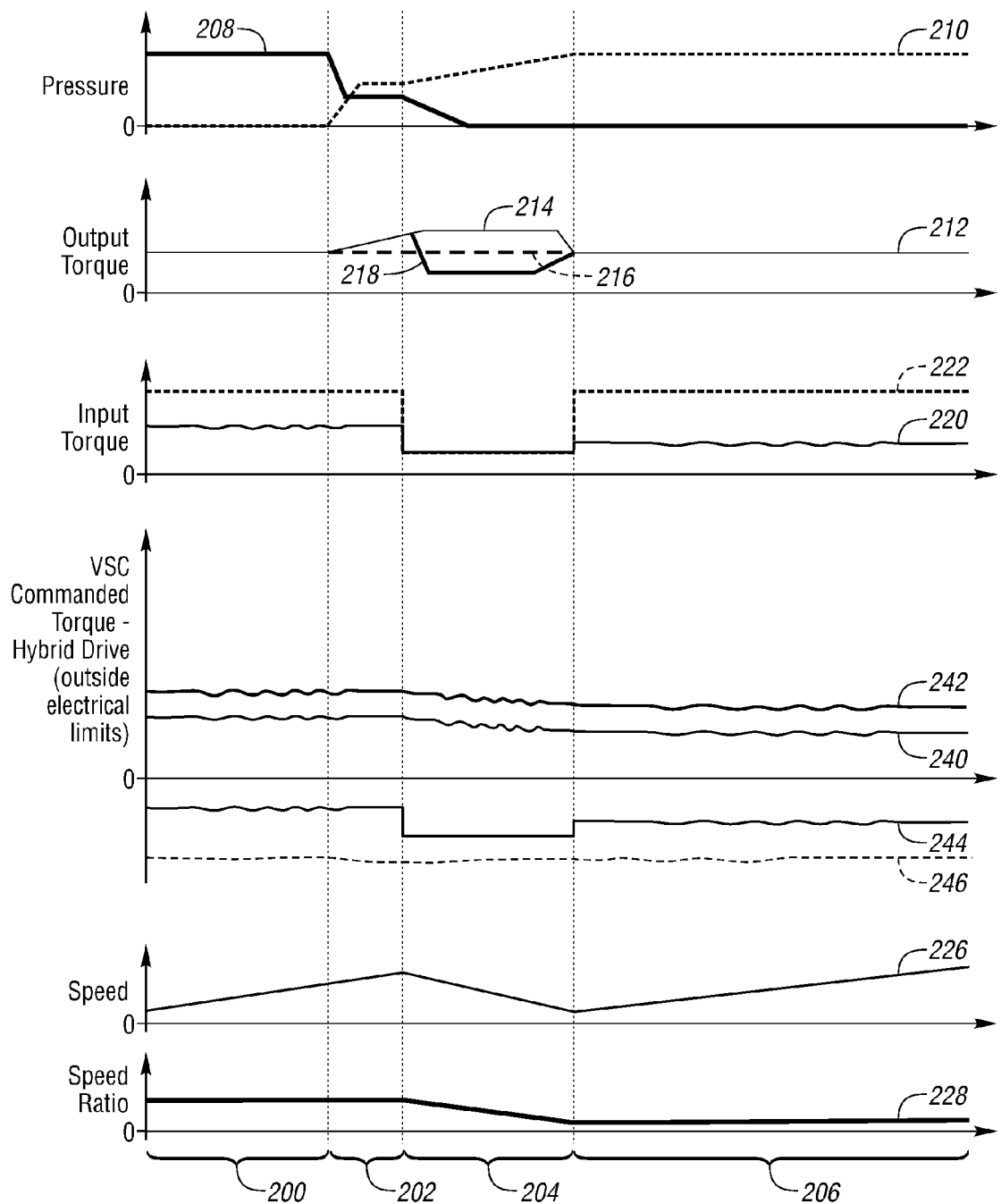
FIG. 5 is a timing chart for the hybrid vehicle during a user requested upshift in a hybrid mode of vehicle operation according to an embodiment.

FIG. 5 illustrates a timing chart representative of an example of subroutine B in method 100. The vehicle 10 is operating in a hybrid mode of operation, and is within the electrical limits of the vehicle such that the M/G 18 alone is able to provide the torque to offset the inertia torque in the upshift.

The driver demand input torque is shown by line 240, and may be determined by the control system 46 from an APPS, for example. Line 240 also includes any additional vehicle torque requests for auxiliary systems, etc.

Line 242 illustrates the commanded engine 14 torque output to crankshaft 28. Line 244 represents the commanded or requested M/G 18 output torque. Line 246 shows an electrical limit of the vehicle 10. As can be seen, the upshift remains within the electrical limits of the vehicle 10, and the M/G 18 may be used to counteract the inertia torque during the torque phase of the upshift. The M/G output torque 244 is reduced during the inertia phase of the shift to offset the inertia torque 214. Also, as can be seen from the figure, the combination of the engine torque output 242 and the M/G torque output 244 generally equal the driver demanded input torque 240.

Figure 6:
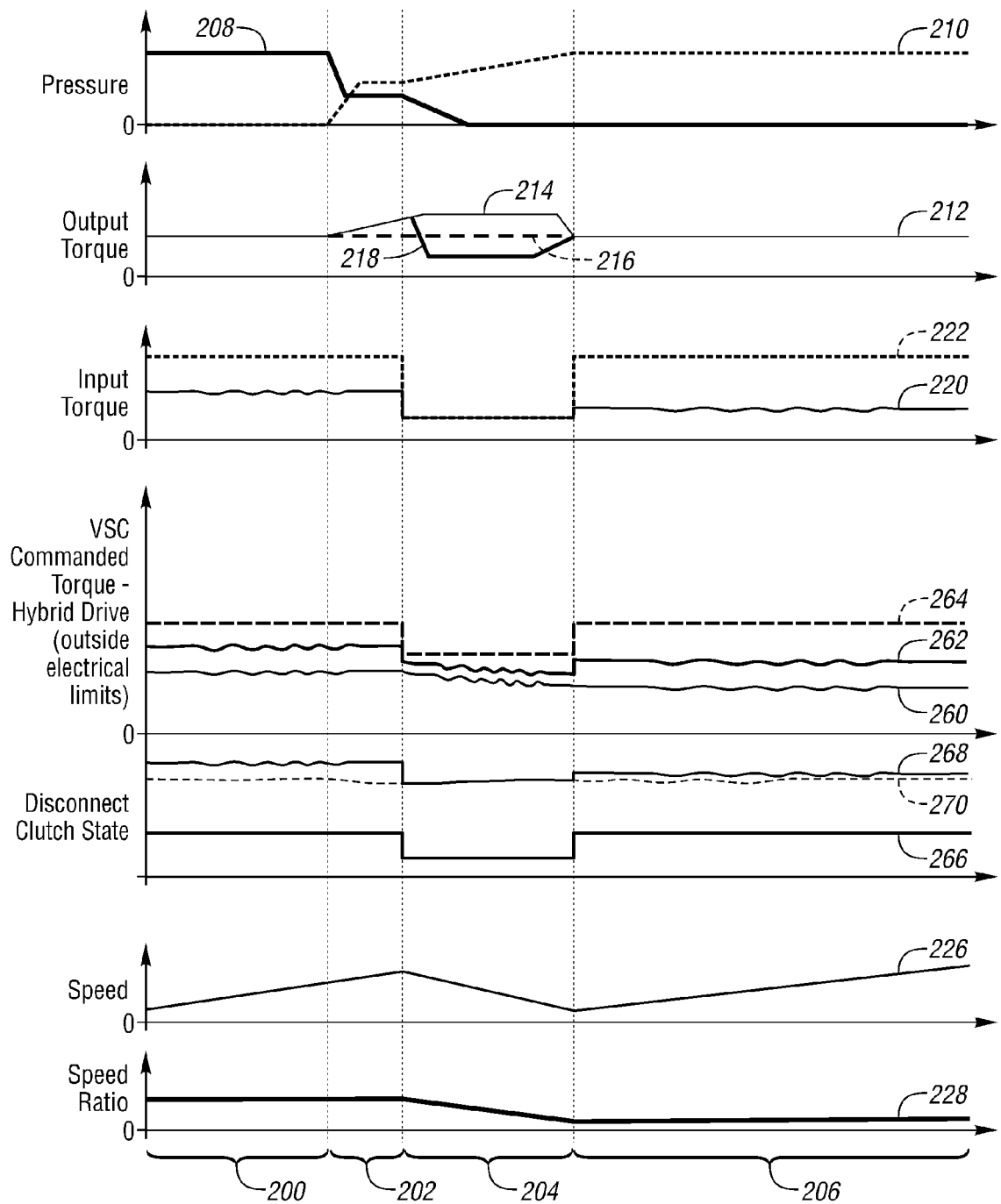
FIG. 6 is a timing chart for the hybrid vehicle during a user requested upshift in a hybrid mode of vehicle operation according to another embodiment.

FIG. 6 illustrates a timing chart representative of an example of subroutine D in method 100. The vehicle 10 is operating in a hybrid mode of operation, is outside the electrical limits of the vehicle, and beyond the engine fast torque limits. The disconnect clutch 26 is slipped and the engine 14 and M/G 18 torques are then controlled to offset the inertia torque in the upshift.

The driver demand input torque is shown by line 260, and may be determined by the control system 46 from an APPS, for example. Line 262 illustrates the commanded engine 14 torque output to crankshaft 28. Line 264 shows the maximum torque available from the engine 14. At the beginning of the inertia phase 204, the engine torque output 262 is above the maximum available engine torque 264. The commanded or requested M/G 18 output torque is shown by line 268. Line 270 shows the electrical limit of the vehicle 10. The M/G torque output 268 goes beyond the electrical limit 270 during the inertia phase 204 of the shift. The control system 46 causes the method 100 to enter subroutine D.

The disconnect clutch 26 is slipped at the beginning of the inertia torque phase 204, as shown by the decrease in the disconnect clutch pressure 266. The disconnect clutch 26 is reengaged as the shift completes. The engine torque output 262 is reduced via fast torque reduction and the M/G torque output 268 is reduced during the inertia phase 204. As can be seen from the figure, the combination of the engine torque output 262 and the M/G torque output 268 generally equal the driver demanded input torque 240.

Figure 7:
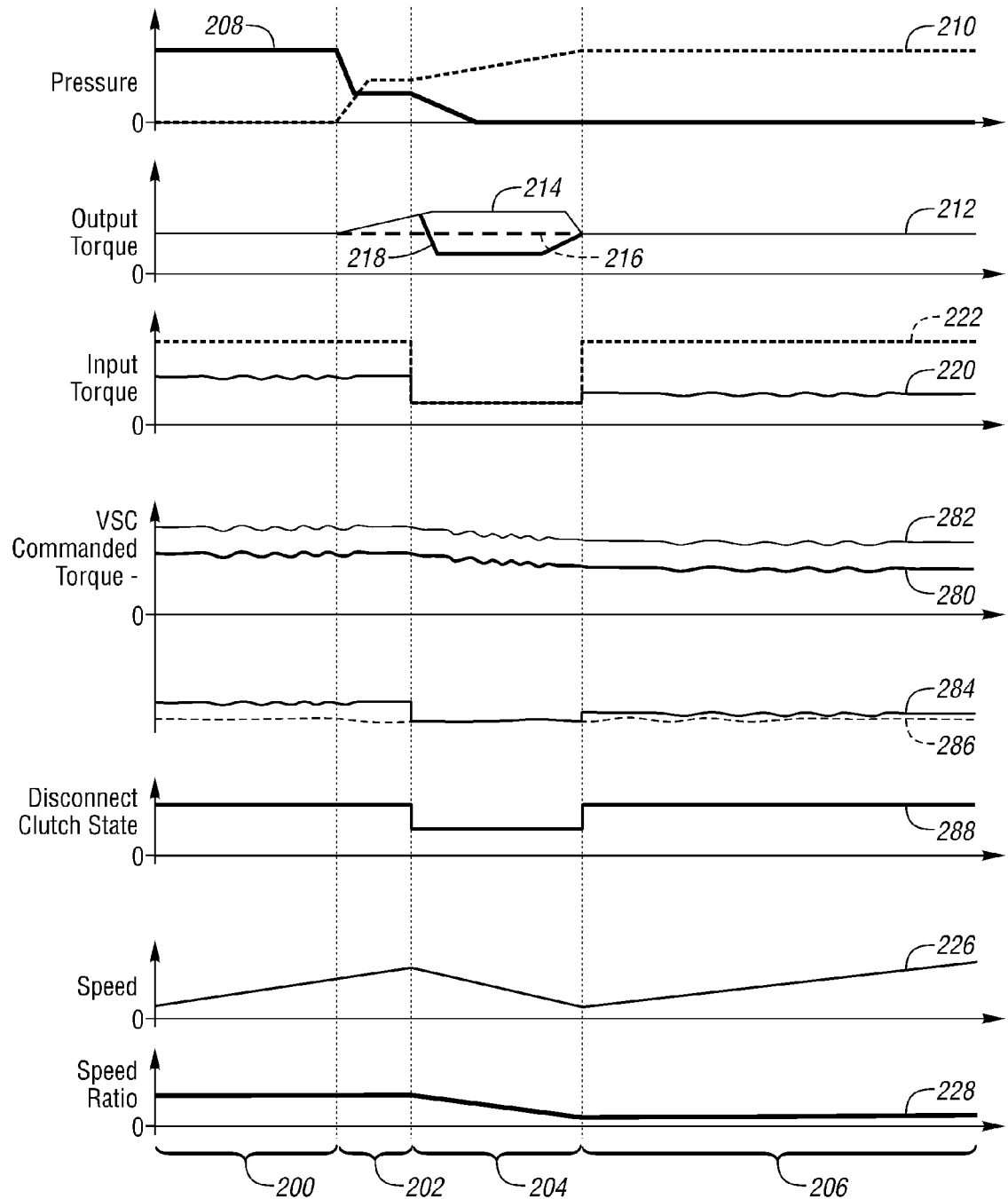
FIG. 7 is a timing chart for the hybrid vehicle during a user requested upshift in a hybrid mode of vehicle operation according to yet another embodiment.

FIG. 7 illustrates another example a timing chart representative of an example of another subroutine in method 100. The vehicle 10 is operating in a hybrid mode of operation, and is outside the electrical limits of the vehicle, such that the disconnect clutch 26 is slipped and the M/G 18 torque is controlled to offset the inertia torque in the upshift. The clutch 26 is slipped to compensate for inertia torque prior to reducing engine torque via fast path torque reduction. This may decrease emissions for a spark ignition as there is no spark retard.

The driver demand input torque is shown by line 280, and may be determined by the control system 46 from an APPS, for example. Line 282 illustrates the commanded engine 14 torque output to crankshaft 28, and as can be seen from the figure, is not reduced via fast path torque reduction, such as spark retard. The commanded or requested M/G 18 output torque is shown by line 284. Line 286 shows the electrical limit of the vehicle 10. The M/G torque output 284 goes beyond the electrical limit 286 during the inertia phase 204 of the shift. The control system 46 causes the method 100 to enter the subroutine. The disconnect clutch 26 is slipped at the beginning of the inertia torque phase 204, as shown by the decrease in the disconnect clutch pressure 288 while the M/G 18 torque output 268 is reduced during the inertia phase 204.

Various embodiments of the present disclosure have associated, non-limiting advantages. For example, the engine, electric machine, and disconnect clutch may be controlled during an upshift in a transmission gearbox to compensate for inertia torque caused by inertia changes in the powertrain during an inertia phase of the upshift. Slipping the disconnect clutch during an upshift reduces the rotational inertia contributed by the engine and crankshaft to the overall powertrain inertia. Slipping the disconnect clutch during an upshift also reduces the input torque to the transmission as the engine torque transmitted to the motor shaft through the disconnect clutch is limited by the torque capacity of the clutch.

In an example, the M/G is used for torque reduction during the upshift and results in no increase in emissions as there is no spark retard for the engine, and an increase state of charge of the battery as the M/G is generating and charging the battery while reducing torque. In another example, the M/G and engine fast torque are used for torque reduction during the upshift with the upstream clutch locked, which may increase emissions and may also increase the life of the upstream clutch and provide a more robust control strategy. In yet another example, the M/G is used for torque reduction during the upshift while the upstream clutch is modulated, which results in no increase in emissions and may also reduce the life of the upstream clutch. In another example, the M/G and engine fast torque are used for torque reduction during the upshift while the upstream clutch is modulated and may be the only available option to sufficiently reduce torque during a high speed shift with the high inertia of the MHT driveline, and may also result in an increase in emissions, a reduced life of the upstream clutch, and may be difficult to achieve robust control. Based on the operating state of the vehicle, the specific vehicle and component architecture, and the vehicle control targets (i.e. emissions, etc.), the various examples may be prioritized or ordered in various ways.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
an engine;
an electric machine connected to the engine by an upstream clutch;
a transmission gearbox connected to the electric machine by a downstream clutch; and
a controller configured to, in response to a commanded upshift of the gearbox, modulate a pressure of the upstream clutch while maintaining a vehicle operation mode, and command the upstream clutch to lock when the upshift is completed.

2. The vehicle of claim 1 wherein modulating the pressure comprises reducing a line pressure to the upstream clutch to slip the upstream clutch.

3. The vehicle of claim 2 wherein the controller is further configured to command the engine to a reduced nonzero torque output via fast path torque reduction controls to prevent engine speed increasing caused by the slipping the upstream clutch during the upshift.

4. The vehicle of claim 1 wherein the controller is further configured to command the electric machine to a reduced torque output to offset inertia torque for the upshift.

5. The vehicle of claim 1 wherein the controller is further configured to command the engine to a reduced nonzero torque output via fast path torque reduction controls to offset inertia torque for the upshift.

6. The vehicle of claim 1 wherein the controller is further configured to command the electric machine to a reduced torque output to offset inertia torque for the upshift, and command the engine to a reduced torque output via fast path torque reduction controls to offset inertia torque for the upshift.

7. The vehicle of claim 1 wherein the transmission gearbox is an automatic, step ratio transmission gearbox.

8. The vehicle of claim 1 wherein the transmission gearbox contains at least two shifting clutches.

9. The vehicle of claim 8 wherein the controller is further configured to modulate the pressure of the at least two shifting clutches for the upshift.

10. A method for controlling a vehicle having an engine selectively coupled to an electric machine by an upstream clutch with the electric machine selectively coupled to a transmission gearbox by a downstream clutch, comprising, in response to a commanded upshift of the gearbox, controlling the upstream clutch to a first nonzero speed differential corresponding to a first inertia connected to and upstream of the gearbox to reduce inertia torque during the upshift and maintaining an operating mode of the vehicle across the upshift.

11. The method of claim 10 wherein the vehicle has a second inertia connected to and upstream of the gearbox when a second speed differential across the upstream clutch is zero, the first speed differential greater than the second speed differential.

12. The method of claim 11 wherein the first inertia is less than the second inertia for an equivalent engine speed.

13. The method of claim 10 further comprising controlling the engine to reduce engine torque to the gearbox using a fast torque reduction path during the upshift.

14. The method of claim 10 further comprising controlling the electric machine to reduce electric machine torque output to the gearbox during the upshift.

15. The method of claim 10 further comprising controlling the first speed differential based on an engine crankshaft speed and an electric machine shaft speed.

16. A method for controlling a vehicle having an electric machine coupled to an engine by an upstream clutch and coupled to a transmission gearbox by a downstream clutch, comprising:
in response to a commanded gearbox upshift when beyond an electrical limit and a fast path torque reduction limit, slipping the upstream clutch, reducing a torque output of the engine, and reducing a torque output of the electric machine while maintaining a vehicle operation mode.

17. The method of claim 16 further comprising, in response to a commanded gearbox upshift when beyond the electrical limit and within the fast path torque reduction limit, reducing the torque output of the electric machine, reducing the engine torque output and maintaining upstream clutch engagement to reduce inertia and torque upstream of the gearbox to offset an inertia torque caused by the upshift.

18. The method of claim 16 further comprising, in response to a commanded gearbox upshift when within the electrical limit, reducing the torque output of the electric machine, maintaining the engine torque output and maintaining upstream clutch engagement to reduce inertia and torque upstream of the gearbox to offset an inertia torque caused by the upshift.

* * * * *